United States Patent [19]
Serizawa

[11] Patent Number: 5,615,117
[45] Date of Patent: Mar. 25, 1997

[54] METHOD FOR CONTROLLING A FRONT AND REAR WHEEL STEERING SYSTEM

[75] Inventor: Mitsuya Serizawa, Saitama-ken, Japan

[73] Assignee: Honda Giken Kogyo Kabushiki Kaisha, Tokyo, Japan

[21] Appl. No.: 328,844

[22] Filed: Oct. 25, 1994

[30] Foreign Application Priority Data

Dec. 1, 1993 [JP] Japan .................................. 5-338860

[51] Int. Cl.$^6$ ........................................................ B62D 6/04
[52] U.S. Cl. ................... 364/424.052; 180/413; 180/410; 180/446
[58] Field of Search .................. 364/424.05; 180/79.1, 180/140; 280/91

[56] References Cited

U.S. PATENT DOCUMENTS

| | | | |
|---|---|---|---|
| 4,313,514 | 2/1982 | Furukawa et al. | 180/143 |
| 4,412,594 | 11/1983 | Furukawa et al. | 180/140 |
| 4,597,462 | 7/1986 | Sano et al. | 180/140 |
| 4,703,822 | 11/1987 | Kawamoto et al. | 180/140 |
| 4,773,012 | 9/1988 | Ito et al. | 364/424.05 |
| 5,097,917 | 3/1992 | Serizawa et al. | 180/79.1 |
| 5,236,335 | 8/1993 | Takeuchi et al. | 180/79.1 |
| 5,267,160 | 11/1993 | Ito et al. | 364/424.05 |
| 5,457,632 | 10/1995 | Tagawa et al. | 364/424.05 |

*Primary Examiner*—Collin W. Park
*Attorney, Agent, or Firm*—Weiner, Carrier & Burt, P.C.; Joseph P. Carrier; Irving M. Weiner

[57] ABSTRACT

In a method for controlling a front and rear wheel steering system in which front wheels of a vehicle are steered according to a combination of a steering wheel input and an output from a compensatory front wheel steering actuator, and rear wheels of the vehicle are steered by a rear wheel steering actuator. The front wheel steering angle is augmented according to the deviation of the actual yaw rate from a target yaw rate computed from the travelling speed of the vehicle and the steering input from the steering wheel to compensate for the delay in the yaw rate response so that the rear end of the vehicle would not be swung sideways during a turning maneuver, and the vehicle operator would not be subjected to any unfamiliar feeling. Furthermore, when the vehicle is subjected to a side wind or cross wind, because the orientation of the vehicle is corrected from the downwind direction to the upwind direction by steering the front wheel, it is possible to restore the orientation of the vehicle to an appropriate direction without the vehicle being wholly thrown laterally by the side wind. The rear wheels are steered so as to reduce the side slip angle to zero as an additional feature of the present invention, whereby the orientation of the vehicle during a turning maneuver may be aligned with the actual trajectory of the vehicle, and the driveability of the vehicle can be improved.

10 Claims, 6 Drawing Sheets

METHOD FOR CONTROLLING A FRONT AND REAR WHEEL STEERING SYSTEM

TECHNICAL FIELD

The present invention relates to a method for controlling a front and rear wheel steering system, and in particular to a method for electronically controlling a front and rear wheel steering system which can further improve the response property of a vehicle to external disturbances and changes in the running condition of the vehicle.

BACKGROUND OF THE INVENTION

To the end of improving the responsiveness and stability of a vehicle in a turning maneuver, various forms of front and rear wheel steering systems have been proposed. Normally, the rear wheels are steered according to the steering angle of the front wheels effected by the turning of the steering wheel, and various parameters of the vehicle such as vehicle speed are used for determining the steering angle of the rear wheels or the ratio of the rear wheel steering angle to the front wheel steering angle.

It has been established that a front and rear wheel steering system such as a four wheel steering system is highly effective in improving the behavior of the vehicle when the steering wheel is turned by the will of the vehicle operator, for instance, for changing lanes and avoiding an object. For details of conventional front and rear wheel steering systems, reference should be made, for instance, to U.S. Pat. No. 4,313,514 issued Feb. 2, 1982 to Furukawa et al.

However, if the rear wheels are simply steered only in association with the steering angle of the front wheels, it is not possible to effectively control the behavior of the vehicle when subjected to external disturbances such as side wind or cross wind and irregularities of the road surface.

Therefore, recently, there have been attempts to include the dynamic behavior of the vehicle in the parameters for determining the steering angle of the rear wheels. In particular, it has been proposed to detect the yaw rate of the vehicle, and use it as a parameter for determining the steering angle of the rear wheels. More specifically, when a yaw rate is detected and this yaw rate is determined to be caused not by the turning of the steering wheel, it is assumed that the vehicle is subjected to external disturbances such as side wind, and the rear wheels are automatically steered so as to cancel this yaw rate.

It is generally believed that the driveability of a vehicle is more improved as the delay in the yaw rate response is smaller, and it is known that the yaw rate response can be improved if the front and rear wheels are steered in an opposite phase relationship in an early phase of turning the steering wheel. However, when this is actually implemented, the vehicle operator may experience an unfamiliar impression because when the vehicle operator turns the steering wheel in one direction the rear wheels are initially steered in an opposite direction and the rear part of the vehicle is slightly swung in an unexpected direction.

When the vehicle is turned in a downwind direction by side wind, and an effort is made to turn the vehicle toward the wind by steering the rear wheels in an attempt to restore the vehicle to the straight ahead direction, the rear part of the vehicle has to be swung in downwind direction, and the vehicle has to make a highly distinct lateral shifting movement to keep the vehicle on a straight course.

As an additional problem, the vehicle normally involves a certain side slip angle, and the resulting slight discrepency between the direction of the actual movement of the vehicle and the orientation of the vehicle may impair the driveability of the vehicle. Normally, a vehicle tends to be oriented outward with respect to the tangential line of the turning radius of the vehicle in a low speed range. Conversely, in a high speed range, a vehicle tends to be oriented inward with respect to the tangential line of the turning radius of the vehicle.

BRIEF SUMMARY OF THE INVENTION

In view of such problems of the conventional systems, a primary object of the present invention is to provide a method for controlling a front and rear wheel steering system which can quickly achieve a desired yaw rate of the vehicle without causing any unfamiliar impression to the vehicle occupants.

A second object of the present invention is to provide a method for controlling a front and rear wheel steering system which can favorably control undesirable effects of external disturbances.

A third object of the present invention is to provide a method for controlling a front and rear wheel steering system which can improve the driveability of the vehicle by reducing the side slip angle of the vehicle.

According to the present invention, these and other objects can be accomplished by providing a method for controlling a front and rear wheel steering system in which front wheels of a vehicle are steered according to a combination of a steering wheel input and an output from a compensatory front wheel steering actuator, and rear wheels of the vehicle are steered by a rear wheel steering actuator, the method comprising the steps of: defining a target yaw rate according to a travelling speed of the vehicle and the steering wheel input; detecting an actual yaw rate of the vehicle; executing a feedback control of the compensatory front wheel steering actuator according a deviation of an actual yaw rate from the target yaw rate; and executing a feedforward control of the rear wheel steering actuator so as to reudce a side slip angle of the vehicle substantially to zero.

Thus, the yaw rate response is compensated for by augmenting the steering angle of the front wheels in the same direction as the steering input, and the vehicle operator would not be subjected to any unusual impression. Also, when the vehicle encounters a cross wind, because the front wheels are steered in the upwind direction, the orientation of the vehicle can be promptly and efficiently restored to the straight ahead direction wihout excessively swinging the rear part of the vehicle sideways. Furthermore, because the rear wheels are steered so as to reduce the side slip angle of the vehicle (the center of gravity of the vehicle) to zero, the orientation of the vehicle can be matched with the path of the vehicle, and the driveability of the vehicle can be improved.

According to a preferred embodiment of the present invention, a transfer function for executing the feedforward control of the rear wheel steering actuator accounts for a lateral rigidity of tires of the vehicle so that the side slip angle of the vehicle can be favorably controlled even in transient conditions. Also, a gain of the feedback control of the front wheel steering actuator may be varied in dependence on the vehicle speed so that a favorable control may be ensured in a high speed range without causing any instability in a low speed range.

Preferably, a gain of a transfer function for steering the rear wheels is reduced in a low speed range to limit a maximum steering angle of the rear wheels. Thus, such advantages as ensuring safety in case of a malfunction of the rear wheel steering system and avoiding interferences of the tires with the wheel house and the suspension arms can be achieved.

When the target yaw rate is limited by a certain upper limit value, it is possible to avoid the situation in which the theoretical movement of the vehicle cannot be achieved due to limitations on the physical conditions imposed on the vehicle. For instance, the target yaw rate may be limited below the upper limit value by using a limiter table which defines an upper limit to a lateral acceleration below a certain level associated with a frictional coefficient of tires of the vehicle, and converts the limited lateral accleration to the limited yaw rate. In particular, when the limiter table is modified according to an actual frictional coefficient between tires of the vehicle and a road surface, it is possible to fully utilize the maneuvering capability of the vehicle under each given physical condition such as the condition of the road surface.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
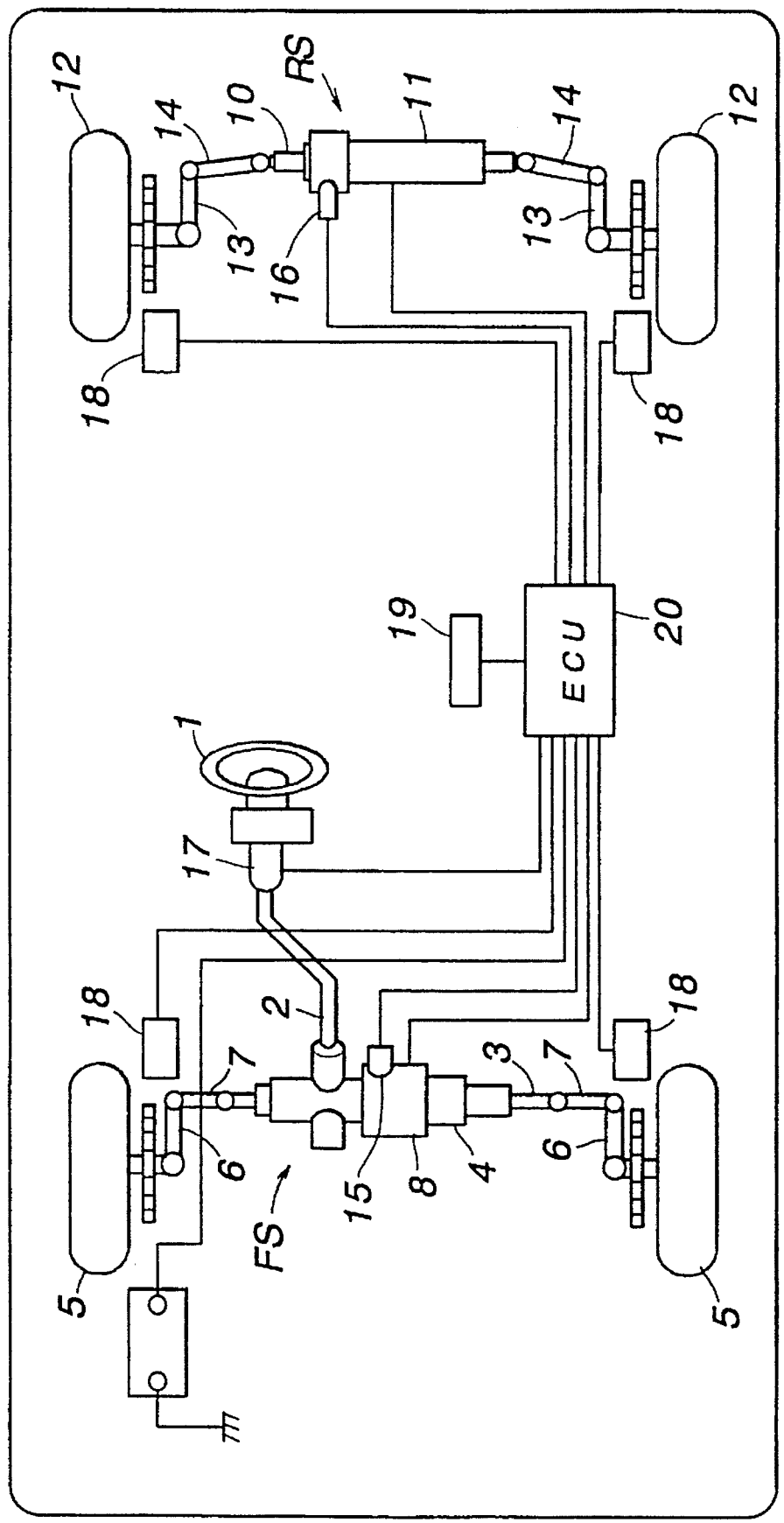
FIG. 1 is a general schematic view of a vehicle equipped with a front and rear wheel steering system to which the present invention is applied.

FIG. 1 schematically illustrates the overall structure of a front and rear wheel steering system according to the present invention. A steering shaft 2 carrying a steering wheel 1 fixedly secured to an upper end thereof is connected to a steering rod 3 of a front wheel steering unit FS via a steering gear box 4 typically incorporating a rack and pinion mechanism. The steering rod 3 extends laterally of the vehicle body, and its two outer ends are connected, via tie rods 7, to knuckle arms 6 extending from wheel carriers supporting right and left front wheels 5. The steering gear box 4 can be moved laterally of the vehicle body with an electric motor 8 fixedly secured to the vehicle body so as to modify and compensate the steering angle of the front wheels 5. The steering gear box 4 is incorporated with an electric motor (not shown in the drawing) so as to assist the steering input applied to the steering wheel 1 in a well known manner.

A rear wheel steering unit RS is placed in a rear part of the vehicle body, and is likewise adapted to move a steering rod 10 extending laterally of the vehicle body by using an electric motor 11. The two ends of the steering rod 10 are also connected, via tie rods 14, to knuckle arms 13 extending from wheel carriers supporting right and left rear wheels 12.

The front wheel steering unit FS is provided with a steering angle sensor 15 for measuring the actual steering angle of the front wheels 5, and the rear wheel steering unit RS is provided with a steering angle sensor 16 for measuring the actual steering angle of the rear wheels 12. The steering shaft 2 is also provided with a steering angle sensor 17 for measuring the steering input to the steering wheel 1. Additionally, the front and rear wheels 5 and 12 are provided with vehicle speed sensors 18, and a yaw rate sensor 19 is mounted at a suitable location on the vehicle body.

These sensors 15 through 19 are electrically connected to a computer unit 20 for controlling the electric motors 8 and 11 for the front and rear wheel steering units FS and RS.

In this system, as the steering wheel 1 is turned by the vehicle operator, the steering rod 3 of the front wheel steering unit FS is mechanically actuated, and the front wheels 5 are steered accordingly. At the same time, the outputs from the sensors 15 through 19 are supplied to the computer unit 20. The computer unit 20 determines an appropriate compensatory angle of the front wheels 5 and an optimum steering angle of the rear wheels according to the steering wheel angle $\theta_h$, the vehicle speed V and the yaw rate $\gamma$ sensed by the sensors 15 through 19, and steers the front and rear wheels 5 and 12 according to these computed angles by using the electric motors 8 and 11 of the front and rear wheel steering units FS and RS.

Figure 2:
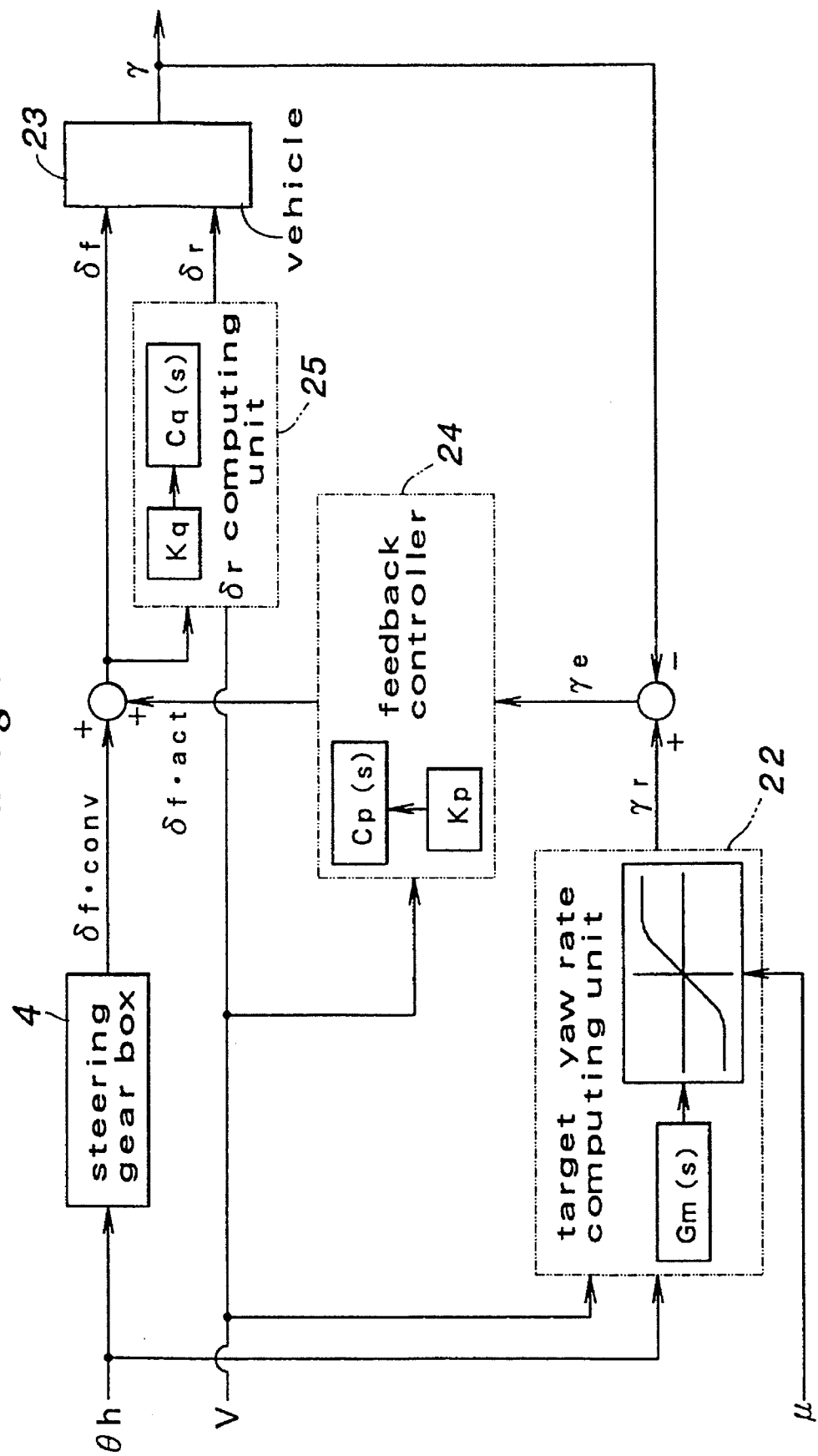
FIG. 2 is a functional block diagram showing the control action according to the present invention.

FIG. 2 is a block diagram showing the control structure for this front and rear wheel steering system.

First of all, the control action for the compensatory steering of the front wheels is desribed. A reference front wheel steering angle $\delta_{f,conv}$ for a given steering input $\theta_h$ is determined by the gear ratio of the steering gear box 4 of the front wheel steering unit FS. Meanwhile, a target yaw rate $\gamma_r$ for the given steering input $\theta_h$ is computed by the target yaw rate computing unit 22. The target yaw rate computing unit 22 also receives the vehicle speed V to account for the vehicle speed in the computed target yaw rate $\gamma_r$. The target yaw rate computing unit 22 produces the target yaw rate $\gamma_r$ somewhat earlier than actually needed so that the delay in the actual yaw rate of the vehicle in responding to the steering input may be compensated.

The target yaw rate $\gamma_r$ and the actual yaw rate $\gamma$ of the vehicle 23 are compared, and a yaw rate deviation $\gamma_e$ ($\gamma_e = \gamma_r - \gamma$) is obtained. This yaw rate deviation $\gamma_e$ is supplied to a feedback controller 24 which then computes a compensated front wheel steering angle $\delta_{f,act}$. The front wheels 5 are steered by an angle $\delta_f$ given as a combination of the compensated front wheel steering angle $\delta_{f,act}$ and the reference front wheel steering angle $\delta_{f,conv}$ ($\delta_f = \delta_{f,conv} + \delta_{f,act}$). The feedback controller 24 also receives the vehicle speed V, and carries out an appropriate feedback control taking the vehicle speed into account.

It is generally difficult to assess the behavior of a vehicle in a low speed range, and control parameters are therefore difficult to determine. In particular, a feedback control system may even become unstable. Also, in a low speed range, because the transient vehicle response is relatively mild, and would not affect the vehicle operator to any sigificant extent, the need for compensating the response delay is very small.

Figure 3:
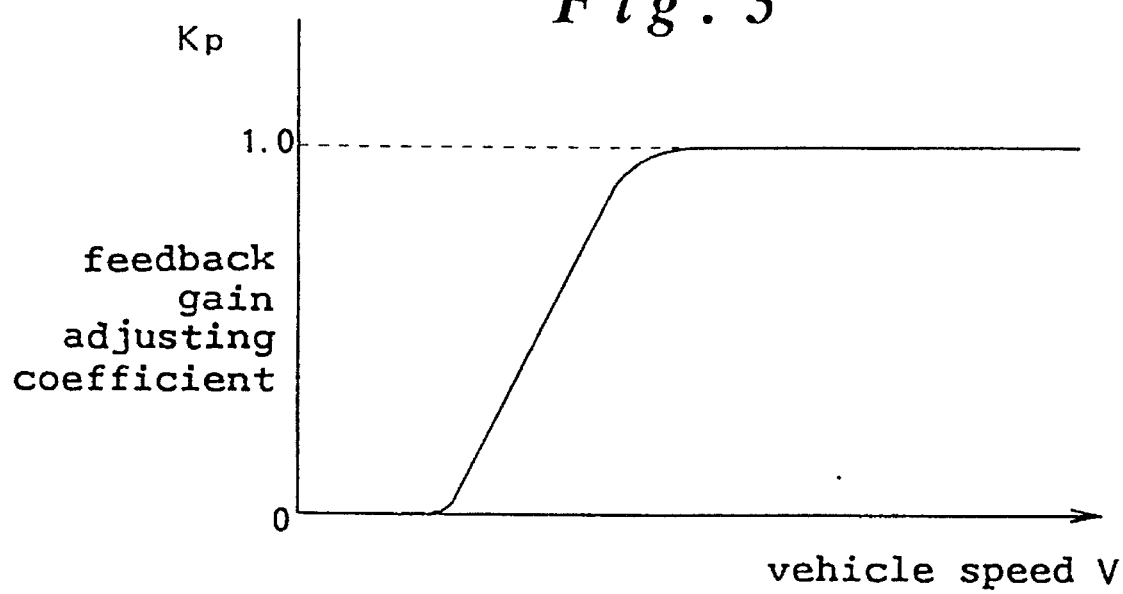
FIG. 3 is a graph showing the relationship between the gain coefficient Kp and the vehicle speed V.

Based on these considerations, in this front and rear wheel steering system, a certain coefficient is selected for adjusting the gain of the feedback controller 24, and the amount of feedback is reduced in a low speed range by changing this coefficient according to the vehicle speed V so that the behavior of the vehicle may remain stable at all times. More specifically, a gain adjusting coefficient Kp as shown in FIG. 3 is multiplied to the transfer function Cp(s) of the feedback controller 24. This coefficient Kp is a mathematical function of the vehicle speed V, and is determined to be zero or an extremely small value in a low speed range, and progressively increases as the vehicle speed V is increased, this value being equal to 1 beyond a certain vehicle speed. Thus, the feedback factor is zero or extremely small in a low speed range, and it is ensured that the behavior of the vehicle would not be destabilized under any circumstance. Because the feedback factor increases progressively with the vehicle speed, in a high speed range, a sufficient amount of feedback will ensure a highly responsive behavior of the vehicle, and an effective resistance against external disturbances can be achieved.

Meanwhile, the target yaw rate $\gamma_r$ is defined so as to account for the transient response of the vehicle to the steering input $\theta_h$ from the steering wheel 1. Because the target yaw rate $\gamma_r$ is computed according to a linear model, it is approximately proportional to the steering angle $\theta_h$ of the steering wheel 1. However, because the behavior of the vehicle depends on the friction between the tires and the road surface, the theoretical movement of the vehicle cannot be achieved in a range exceeding the limit of the tires to grip the road surface. Therefore, if the steering angle is controlled according to the yaw rate deviation $\gamma_e$ without taking into account the road surface condition, the steering angle may be controlled in such a manner that the tires may become unable to grip the road surface, and the vehicle movement may be destabilized.

Figure 4:
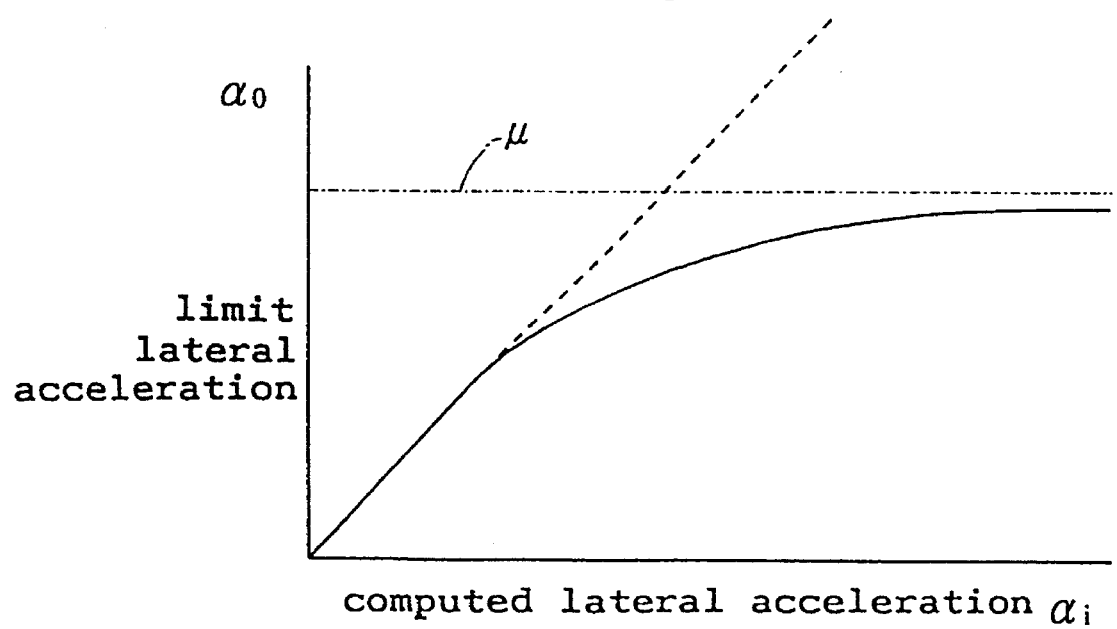
FIG. 4 is a graph showing an example of the limiter table according to the present invention.

According to this embodiment, this problem is resolved in the following manner. The target yaw rate $\gamma_r$ is generated by an appropriate transfer function Gm(s) with respect to the steering input $\theta_h$ and is limited in a certain range by a limiter (which is symbolically indicated in the block diagram by a graph). A lateral acceleration $\alpha_i$ is computed from the target yaw rate $\gamma_{ri}$ and the vehicle speed V before it is put through the limiter.

$$\alpha_i = V \cdot \gamma_{ri}$$

where $\gamma_{ri}$ is the target yaw rate before it is put through the limiter. Because the limit of the friction between the road surface and the tires is determined by the coefficient of friction $\mu$, a limit lateral acceleration $\alpha_0$ is obtained from the computed lateral acceleration $\alpha i$ by using a table as shown in FIG. 4 so as not to exceed the coefficient of friction $\mu$.

The yaw rate $\gamma_{ro}$ corresponding to the limit lateral acceleration $\alpha_0$ obtained from the limiter table can be computed from the following equation.

$$\gamma_{ro} = \alpha_0/V$$

Using $\gamma_{ro}$ as the target yaw rate $\gamma_r$ to be produced from the computing unit 22, the target yaw rate is prevented from becoming unacceptably large without actually needing to measure the lateral acceleration.

FIG. 4 shows an example of the limiter table. By appropriately defininging this limiter table, it is also possible to adjust the steering property of the vehicle. More specifically, by defining the limiter table so that $\alpha_i = \alpha_0$ may approximately hold as indicated by the broken line in FIG. 4, a property of neutral steer can be achieved. By moving the curve away from the broken line ($\alpha_i = \alpha_0$), a property of understeer can be achieved. In the actual situation, a neutral steer condition is desired to be maintained up to a relatively high lateral acceleration range in view of improving the handling of the vehicle in travelling a winding road. On the other hand, in a high speed range, a slight understeer condition is preferred in view of ensuring the stability of the vehicle, and reducing the stress on the vehicle operator. Thus, it is possible to achieve a neutral steer condition in a low speed range, and an understeering condition in a high speed range, by appropriately changing the value obtained from the limiter table according to the vehicle speed. The steering property of the vehicle is also affected by the load and the longitudinal acceleration acting upon the vehicle.

The frictional coefficient $\mu$ of the road surface depends on various factors, and, in particular, is sharply reduced when the road surface is covered by snow or ice. Therefore, if the reference frictional coefficient $\mu$ on which the limiter table is based is fixed, and the frictional coefficient of the actual road surface is substantially less than the reference frictional coefficient $\mu$, steering action tends to be excessive, and the behavior of the vehicle may become unstable. Conversely, if the actual frictional coefficient of the actual road surface is substantially higher than the upper limit of the limiter table, the vehicle would not be turned so sharply as permitted by the frictional coefficient of the actual road surface, and the behavior of the vehicle is therefore not so agile as the vehicle operator considers possible, the vehicle operator will find the handling of the vehicle unsatisfactory.

Figure 5:
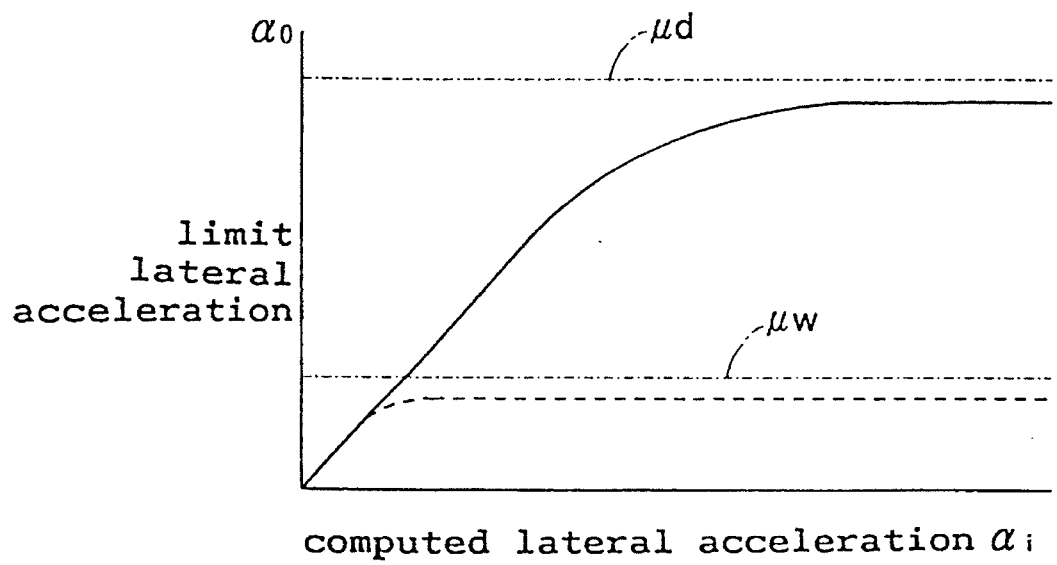
FIG. 5 is a graph showing another example of the limiter table according to the present invention.

Thus, according to this embodiment, the frictional coefcient of the road surface is actually measured, and the measured value is used as the upper limit of the limiter table. More specifically, the frictional coefficient of the actual road surface is measured by frictional coefficient detecting means, and is supplied to the limiter circuit of the target yaw rate computing unit 22, and the upper limit of the limiter table is changed according to the road condition. Thus, the upper limit of the limiter table is made higher as indicated by the solid line in the graph of FIG. 5 when the road surface is dry, and the frictional coefficient is therefore high ($\mu = \mu_d$). When the road surface is covered by snow or ice, the upper limit of the limiter table is made lower as indicated by the dotted line in the graph of FIG. 5 so as to correspond to the frictional coefficient of a snowy or icy road surface ($\mu = \mu_w$). Thus, an optimum target yaw rate $\gamma_r$ can be computed for each different road condition.

Figure 6:
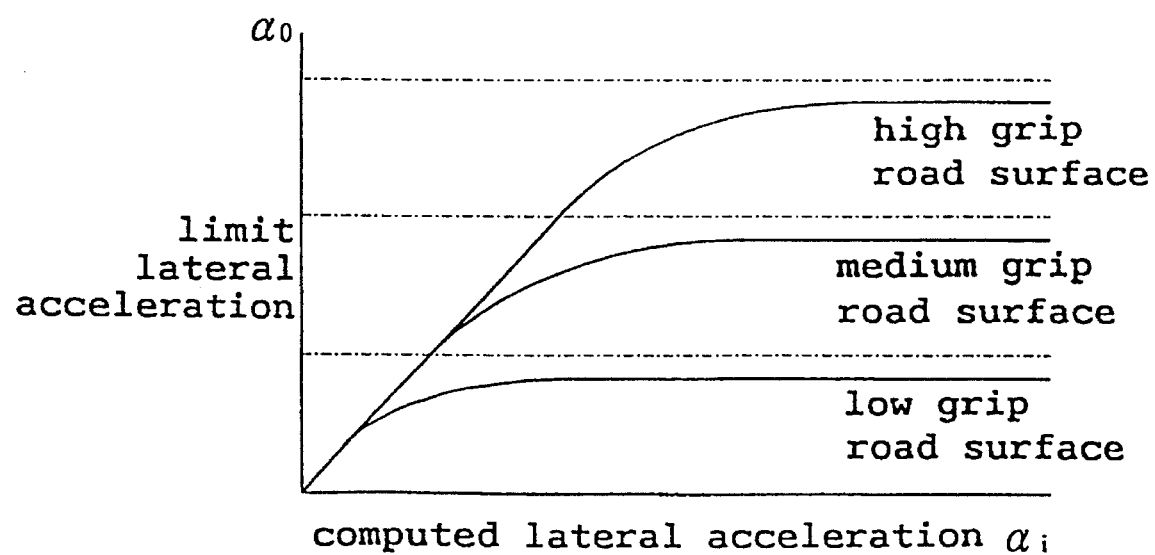
FIG. 6 is a graph showing yet another example of the limiter table according to the present invention.

The value of the frictional coefficient of the road surface that is to be used by the computer unit 20 as a control parameter may be varied not only continually but also by discrete steps. In the latter case, the upper limit of the limiter table will be varied in a stepwise fashion (See FIG. 6).

Now the control of the side slip angle is discussed in the following.

The additive control of the steering angle (before compensation) $\delta_{f,act}$ based on the deviation $\gamma_e$ between the target yaw rate $\gamma_r$ and the actual yaw rate $\gamma$ is effective in improving the vehicle response to the yaw rate, but is not effective in controlling the orientation of the vehicle during a turning maneuver. Therefore, the front wheel steering angle $\delta_f$ and the vehicle speed V are supplied to the rear wheel steering angle computing unit 25, and an appropriate rear wheel steering angle $\delta_r$ is computed.

Figure 7:
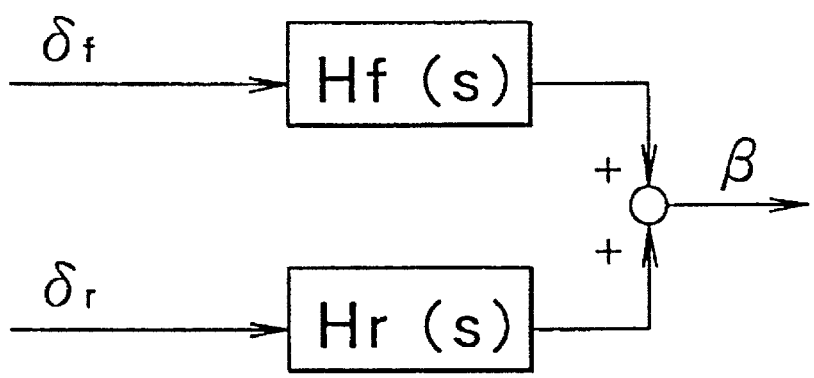
FIG. 7 is a block diagram showing how the side slip angle of the vehicle is related to the front wheel steering angle and the rear wheel steering angle.

If the transfer function of the side slip angle of the front wheels is given by Hf(s), and the transfer function of the side slip angle of the rear wheels is given by Hr(s), the relationship between the front wheel steering angle $\delta_f$, the rear wheel steering angle $\delta_r$, and the side slip angle $\beta$ of the vehicle will be as indicated in FIG. 7, and can be given by the following equation.

$$\beta = \delta_f \cdot Hf(s) + \delta_r \cdot Hr(s)$$

Therefore, to reduce the side slip angle $\beta$ to zero, the following relationship must hold.

$$\delta_r = -\{Hf(s)/Hr(s)\} \cdot \delta_f$$

Figure 8:
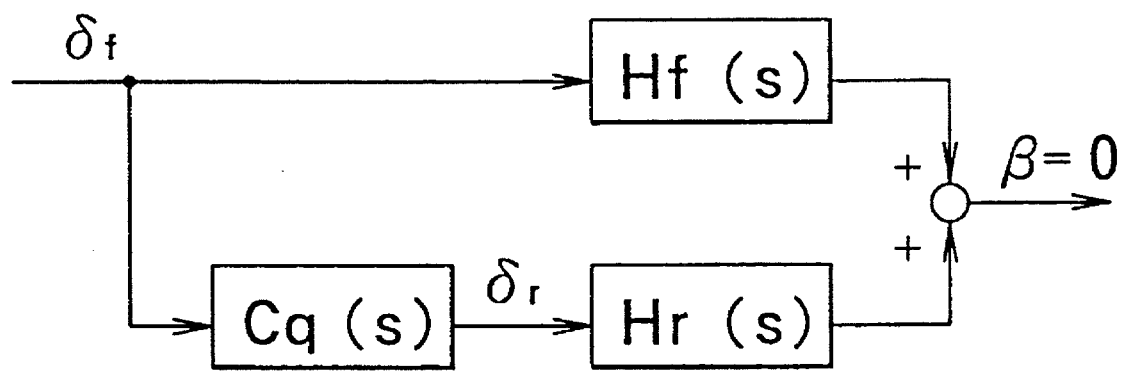
FIG. 8 is a block diagram showing a transfer function for controlling the rear wheel steering angle so as to reduce the side slip angle of the vehicle to zero.

Thus, it can be accomplished according to the control illustrated in FIG. 8.

The transfer function Cq(s) of the rear wheel steering angle computing unit 25 can be expressed by the following equation in which the vehicle is represented by a two-wheeled vehicle.

$$\begin{bmatrix} m \cdot V \cdot (\dot{\beta} + \gamma) = C_f + C_r \\ I \cdot \dot{\gamma} = l_f \cdot C_f + l_r \cdot C_r \\ C_{f,r} = -K_{f,r} \cdot \left( \beta \pm l_{f,r} \cdot \dfrac{\gamma}{V} - \delta_{f,r} \right) \end{bmatrix} \quad (1)$$

where m: weight of the vehicle

Cf, Cr: cornering powers of the front and rear wheels

I: moment of inertia of the vehicle for yaw movement

V: vehicle speed lf, lr: distances of the front and rear axles to the center of gravity $\beta$: slide slip angle of the center of gravity of the vehicle $\delta_f$, $\delta_r$: steering angles of front and rear wheels $\gamma$: yaw rate Kf, Kr: equivalent cornering powers of the front and rear wheels (each comprising two tires)

Hence, the transfer functions Hf(s) and Hr(s) for the side slip angles of the front and rear wheels can be given by the following equations:

$$Hf(s) = \left\{ \dfrac{K_f}{m \cdot V} \cdot s + \left( \dfrac{l_r \cdot K_f \cdot K_r \cdot l}{I \cdot m \cdot V^2} - \dfrac{l_f \cdot K_f}{I} \right) \right\} / \phi(s) \quad (2)$$

$$Hr(s) = \left\{ \dfrac{K_r}{m \cdot V} \cdot s + \left( \dfrac{l_f \cdot K_f \cdot K_r \cdot l}{I \cdot m \cdot V^2} + \dfrac{l_f \cdot K_r}{I} \right) \right\} / \phi(s)$$

$$\phi(s) = s^2 + \left( \dfrac{K_f + K_r}{m \cdot V} + \dfrac{l_f^2 \cdot K_r + l_r^2 \cdot K_r}{I \cdot V} \right) \cdot s + \left( \dfrac{K_f \cdot K_r \cdot l^2}{I \cdot m \cdot V} - \dfrac{l_f \cdot K_f - l_r \cdot K_r}{I} \right)$$

where l is the wheel base.

Therefore, the transfer function Cq(s) of the rear wheel steering angle computing unit 25 is given by the following equation.

$$Cq(s) = -\dfrac{Hf(s)}{Hr(s)} \quad (3)$$

$$= \dfrac{\dfrac{K_f}{m \cdot V} \cdot s + \left( \dfrac{l_r \cdot K_f \cdot K_r \cdot l}{I \cdot m \cdot V^2} - \dfrac{l_f \cdot K_f}{I} \right)}{\dfrac{K_r}{m \cdot V} \cdot s + \left( \dfrac{l_f \cdot K_f \cdot K_r \cdot l}{I \cdot m \cdot V^2} + \dfrac{l_r \cdot K_r}{I} \right)}$$

According to this equation, some side slip angle $\beta$ may be produced in a transient condition (for instance when the steering wheel is turned at high speed). This is due to the disregard for the dynamic properties of the tires. Therefore, the transfer function Cq(s) is modified as given in the following to account for the dynamic properties of the tires.

It is assumed that the cornering powers Cf and Cr of the front and rear wheels are given as in the following:

$$C_{f,r} = -\dfrac{K_{f,r}}{1 + \dfrac{K_{f,r}}{2 \cdot K_{tf,tr} \cdot V} \cdot s} \left( \beta \pm l_{f,r} \cdot \dfrac{\gamma}{V} - \delta_{f,r} \right) \quad (4)$$

where Ktf and Ktr are lateral rigidities of the front and rear wheels (each comprising only one tire). By putting $$d_f = Kf/(2 \cdot Ktf \cdot V)$$

$$d_r = Kr/(2 \cdot Ktf \cdot V)$$

one can write $$Cf = -Kf/(1 + d_f s)$$

$$Cr = -Kr/(1 + d_r s).$$

Therefore, $$Cq(s) = -\dfrac{\dfrac{K_f \cdot d_r}{m \cdot V} \cdot s^2 + \left( \dfrac{K_f}{m \cdot V} - \dfrac{K_f \cdot d_r \cdot l_f}{I} \right) \cdot s + \left( \dfrac{K_f \cdot K_r \cdot l_r \cdot l}{I \cdot m \cdot V^2} - \dfrac{K_f \cdot l_f}{I} \right)}{\dfrac{K_r \cdot d_f}{m \cdot V} \cdot s^2 + \left( \dfrac{K_r}{m \cdot V} + \dfrac{K_r \cdot d_f \cdot l_r}{I} \right) \cdot s + \left( \dfrac{K_f \cdot K_r \cdot l_f \cdot l}{I \cdot m \cdot V^2} + \dfrac{K_r \cdot l_r}{I} \right)} \quad (5)$$

By thus controlling the steering angle $\delta_r$ of the rear wheels in association with the steering angle $\delta_f$ of the front wheels, the side slip angle can be favorably controlled, and the driveability of the vehicle can be improved.

Figure 9:
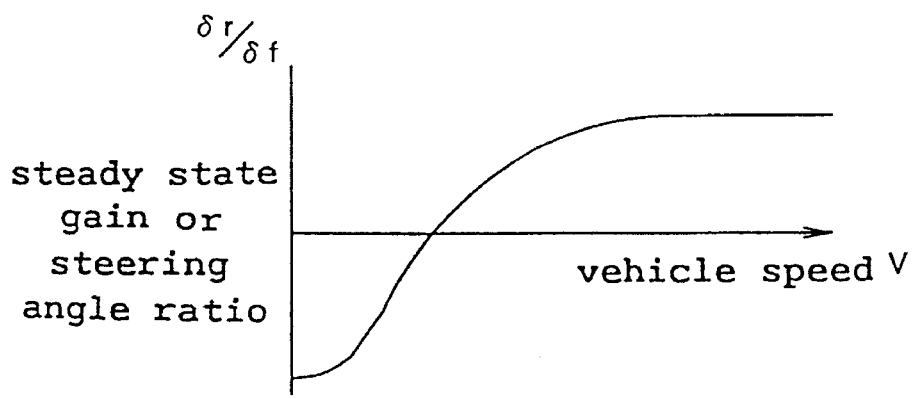
FIG. 9 is a graph showing the relationship between the steady state steering angle ratio and the vehicle speed V before the compensation.

The steady state gain (the ratio of the rear wheel steering angle $\delta_r$ to the front wheel steering angle $\delta_f$) of the transfer function Cq(s) of the rear wheel steering angle computing unit 25 is determined such that the steering angle ratio becomes relatively large in a low speed range as indicated in FIG. 9. However, in an actual vehicle, the maximum steering angle of the rear wheels 12 is relatively limited in order. Therefore, the rear wheel steering angle as given by the cotrol signal may not necessarily be possible.

Figure 10:
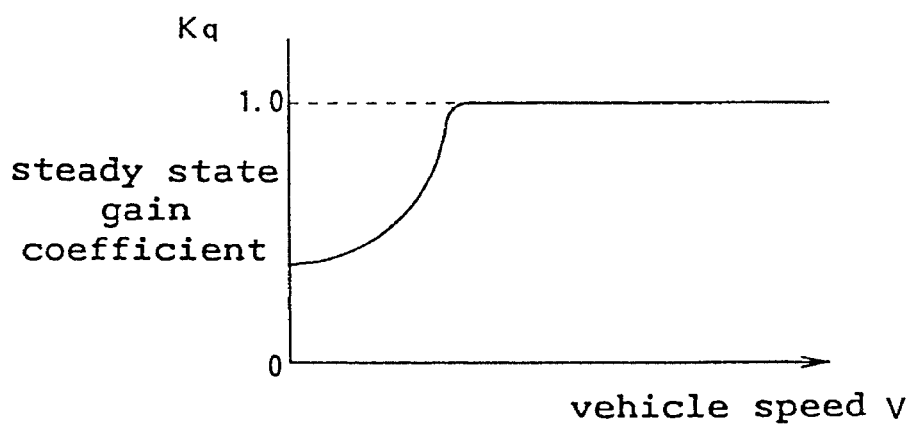
FIG. 10 is a graph showing the relationship between the gain coefficient Kq and the vehicle speed V.
Figure 11:
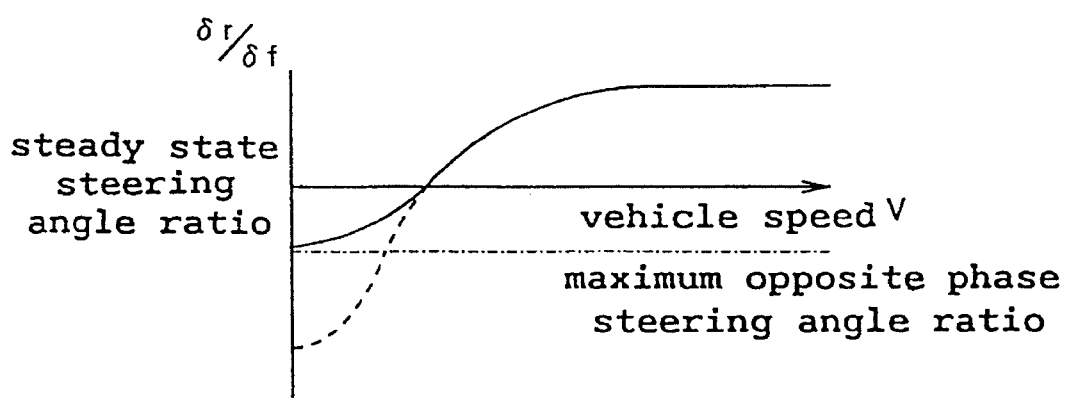
FIG. 11 is a graph showing the relationship between the steady state steering angle ratio and the vehicle speed V after the compensation.

Therefore, a coefficient Kq for adjusting the steady state gain of the rear wheel steering angle computing unit 25 is defined, and is varied in dependence on the vehicle speed so that a command signal for a rear wheel steering angle exceeding the possible limit may be avoided in a low speed range. If the gain for the rear wheel steering angle $\delta_r$ is reduced, the side slip angle may not be so effectively controlled during a turning maneuver. However, the side slip angle is of no significant importance in a low speed range, and the vehicle operator will not be inconvenienced in any way. Also, the turning radius of the vehicle can be made smaller in comparison to the conventional vehicles. More specifically, the coefficient Kq as indicated in FIG. 10 is multiplied to the transfer function Cq (s) of the rear wheel steering angle computing unit 25 (FIG. 2). This coefficient Kq is a mathematical function of the vehicle speed V, and is so determined that its value is less than 1 in a low speed range, and increases progressively with the vehicle speed V, becoming equal to 1 above a certain vehicle speed. Thus, the composite steady state gain will be as indicated in FIG. 11, and the steering angle ratio in a low speed range will not exceed the maximum steering angle of the rear wheels 12.

The results of (A) executing only the yaw rate feedback control of the front wheels, (B) executing only the rear wheel steering angle control so as to reduce the side slip angle to zero, (C) combining these two control actions, and (2WS) steering only the front wheels in a conventional manner are compared. The phase delay of the yaw rate in the frequency response for each of these cases is shown in Table 1, and it can be seen that the combined control action (C) produced the best result.

TABLE 1

| control mode | yaw rate phase delay (deg) | |
| --- | --- | --- |
| | 1 Hz | 2 Hz |
| A | −30 | −75 |
| B | −20 | −60 |
| C | −20 | −50 |
| 2WS | −50 | −100 |

When the yaw rate feedback control of the front wheels (A) and the combined control action (C) are compared, the necessary compensatory steering angle for the front wheels when the combined control action (C) is executed was approximately one half that of the case when only the yaw rate feedback control of the front wheel (A) was executed. Thus, according to the present invention, it is possible to reduce the maximum stroke of the mechanism for the compensatory steering action which typically consists of laterally moving the steering gear box 4, and this provides such advantages as reducing the size of the mechanism, and simplifying precautionary measures against possible malfunction of the mechanism.

According to the control of the rear wheels for reducing the side slip angle to zero (B), when an attempt is made to improve the yaw rate response beyond a certain vehicle speed where the steady state side slip angle is directed inward, the rear wheels are steered in opposite phase relationship to the front wheels when subjected to a step input, and this may create an unfamilar impression to the vehicle operator without the benefit of increasing the speed in laterally shifting the vehicle. On the other hand, according to the combined control action (C), no sigificant change takes place with regard to the control of the rear wheels, and the steering angle of the front wheels are augmented by the yaw rate feedback so that the front part of the vehicle is moved inwardly with regard to the path of the vehicle during the turning manuever, and the lateral movement of the rear part of the vehicle can be avoided. Thus, the vehicle can be moved in a lateral direction without causing any discomfort to the vehicle operator.

Thus, according to the present invention, because the front wheel steering angle is augmented according to the deviation of the actual yaw rate from the target yaw rate to compensate for the delay in the yaw rate response, the vehicle operator would not be subjected to any unfamiliar feeling. In particular, the side movement of the rear part which tends to cause severe discomfort to the vehicle operator can be avoided. Furthermore, when the vehicle is subjected to a side wind or cross wind, because the orientation of the vehicle is corrected from the downwind direction to the upwind direction by steering the front wheel, it is possible to restore the orientation of the vehicle to an appropriate direction without the vehicle being wholly thrown laterally by the side wind. Because the rear wheels are steered so as to reduce the side slip angle to zero as an additional feature of the present invention, the orientation of the vehicle during a turning maneuver may be aligned with the actual trajectory of the vehicle, and the driveability of the vehicle can be thereby improved.

Although the present invention has been described in terms of a specific embodiment, it is possible to modify and alter details thereof without departing from the spirit of the present invention.

What I claim is:

1. A method for controlling a front and rear wheel steering system in which front wheels of a vehicle are steered according to a combination of a steering wheel input and an output from a compensatory front wheel steering actuator, and rear wheels of said vehicle are steered by a rear wheel steering actuator, the method comprising the steps of:

defining a target yaw rate according to a travelling speed of said vehicle and said steering wheel input;

detecting an actual yaw rate of said vehicle;

executing a feedback control of said compensatory front wheel steering actuator according a deviation of an actual yaw rate from said target yaw rate; and executing a feedfoward control of said rear wheel steering actuator so as to reudce a side slip angle of said vehicle substantially to zero.

2. A method for controlling a front and rear wheel steering system according to claim 1, wherein a transfer function for executing said feedforward control of said rear wheel steering actuator accounts for a lateral rigidity of tires of said vehicle.

3. A method for controlling a front and rear wheel steering system according to claim 1, wherein a gain of said feedback control of said front wheel steering actuator is varied in dependence on said vehicle speed.

4. A method for controlling a front and rear wheel steering system according to claim 3, wherein said gain of said feedback control of said front wheel steering actuator is progressively increased with the increasing vehicle speed.

5. A method for controlling a front and rear wheel steering system according to claim 3, wherein said gain of said feedback control of said front wheel steering actuator is zero at low vehicle speeds.

6. A method for controlling a front and rear wheel steering system according to claim 1, wherein a gain of a transfer function for steering said rear wheels is reduced in a low speed range to limit a maximum steering angle of said rear wheels.

7. A method for controlling a front and rear wheel steering system according to claim 1, wherein said target yaw rate is limited by a certain upper limit value.

8. A method for controlling a front and rear wheel steering system according to claim 7, wherein said target yaw rate is limited below said upper limit value by using a limiter table which defines an upper limit to a lateral acceleration below a certain level associated with a frictional coefficient of tires of said vehicle, and converts said limited lateral accleration to said limited yaw rate.

9. A method for controlling a front and rear wheel steering system according to claim 8, wherein said limiter table accounts for said vehicle speed and a vehicle condition.

10. A method for controlling a front and rear wheel steering system according to claim 8, wherein said limiter table is modified according to an actual frictional coefficient between tires of said vehicle and a road surface.

* * * * *

UNITED STATES PATENT AND TRADEMARK OFFICE
CERTIFICATE OF CORRECTION

PATENT NO.  : 5,615,117
DATED       : March 25, 1997
INVENTOR(S) : Mitsuya Serizawa It is certified that error appears in the above-indentified patent and that said Letters Patent is hereby corrected as shown below:

Column 7, line 40, change "If, Ir" to --lf, lr--.

Signed and Sealed this

First Day of July, 1997

Attest:

Attesting Officer

BRUCE LEHMAN

Commissioner of Patents and Trademarks